United States Patent [19]
Clark

[11] 3,890,930
[45] June 24, 1975

[54] ANIMAL COMMODE
[76] Inventor: Michael A. Clark, 476 Bradford St., Brooklyn, N.Y. 11207
[22] Filed: Nov. 2, 1973
[21] Appl. No.: 412,064

[52] U.S. Cl. .................................................. 119/1
[51] Int. Cl. ...................... A01k 29/00; A47k 11/02
[58] Field of Search .................................. 119/1, 19

[56] References Cited
UNITED STATES PATENTS
3,085,550   4/1963   Crawford ............................... 119/1
3,428,026   2/1969   Sohmers et al. ...................... 119/19
3,771,493   11/1973  Chandor ................................ 119/1

Primary Examiner—Hugh R. Chamblee
Attorney, Agent, or Firm—Blum, Moscovitz, Friedman & Kaplan

[57] ABSTRACT

An animal commode including an inner container capable of receiving an animal and carrying a removable lining which can be replaced from time to time. The inner container is received within an outer structure which extends beneath and around the inner container and has an upper portion extending over the top of the inner container while leaving at least at one end of the outer structure an opening through which an animal will have free access into and out of the inner container. The upper portion of the outer structure normally covers and blocks the interior of the inner container from view, particularly from above, while at the same time this upper portion of the outer structure is movable with respect to the remainder thereof to and from a normal position covering the inner container. Thus when the upper portion of the outer structure is moved away from this normal position the inner container is freely accessible so as to render the lining easy to remove and replace.

9 Claims, 7 Drawing Figures

PATENTED JUN 24 1975 3,890,930
SHEET 1

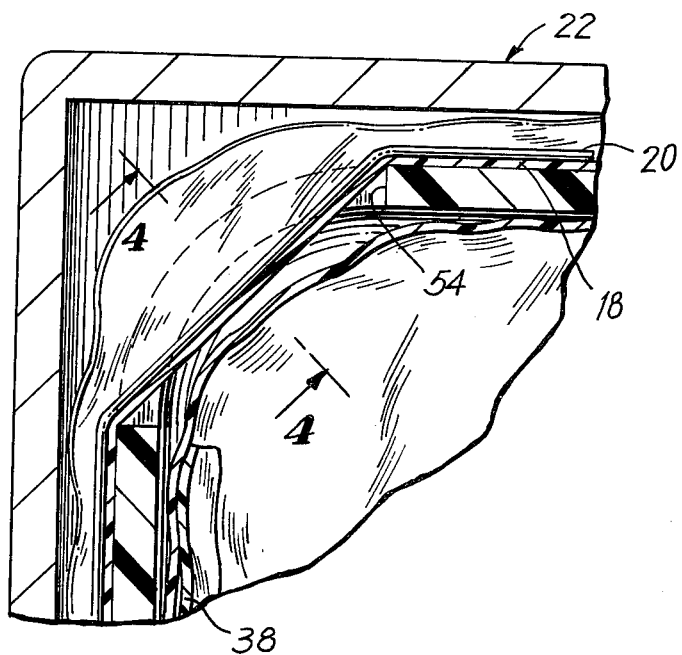
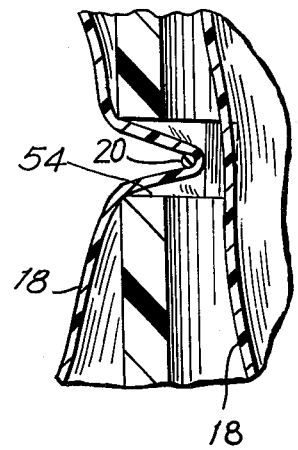
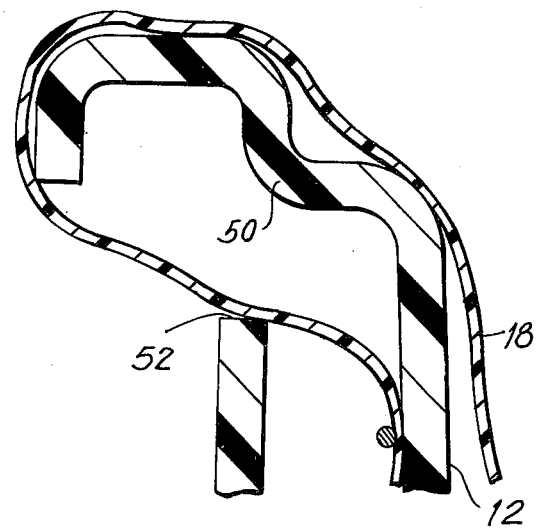
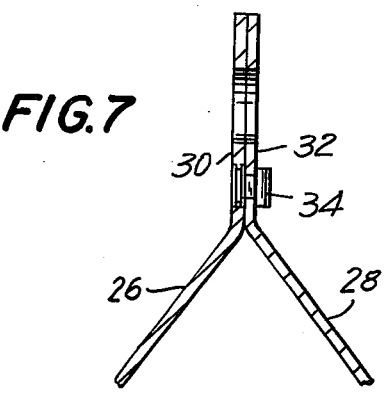
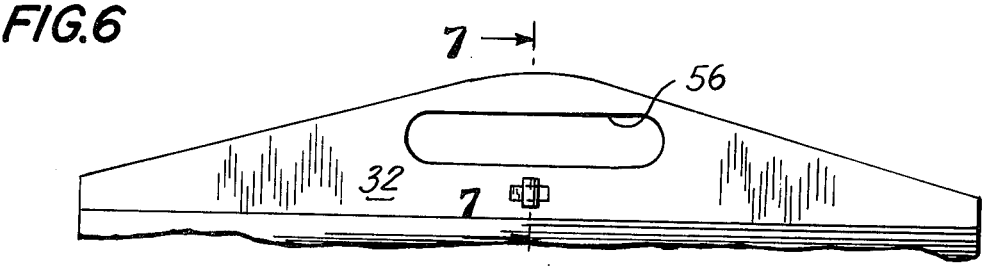

3,890,930

ANIMAL COMMODE

BACKGROUND OF THE INVENTION

The present invention relates to containers and in particular to containers adapted to serve as animal commodes.

Thus, as is well known, household pets must very often be maintained for extended periods of time in a dwelling, so that it becomes necessary to provide a pet under these conditions with suitable sanitary facilities. However, a number of problems are encountered in connection with such facilities.

Thus, while on the one hand it is desired to provide an animal commode which is freely accessible to a pet, on the other hand, it is important to provide for the animal commode conditions according to which it is not likely that the animal commode will become situated underfoot. In addition it is highly desirable to provide for the animal commode conditions which will prevent the animal commode from being freely visible to the occupants of the household or visitors. In addition, it is of course important to provide for the animal commode conditions which will make it easy to maintain cleanliness at the animal commode and which will prevent particulate absorbent matter in the commode from being thrown by the animal out into the space adjacent the commode.

Up to the present time there has been no satisfactory solution to these problems.

SUMMARY OF THE INVENTION

It is accordingly a primary object of the present invention to provide an animal commode which will solve the above problems.

In addition it is an object of the present invention to provide an animal commode which will solve the above problems while at the same time being simple and inexpensive and capable of easy convenient manipulation.

Thus, it is an object of the present invention to provide an animal commode which will not become located underfoot, which will prevent spreading of particulate matter by the animal beyond the commode, which will provide easy access of the animal to and from the commode while at the same time hiding the commode from view and rendering the commode easily portable and easily maintained in a clean condition.

The above objectives are achieved with an animal commode of the present invention, this commode of the invention including an inner container means which removably carries a liner means capable of being readily replaced from time to time. An outer means extends beneath and around the inner container means and has an upper portion situated over the top of the inner container means while leaving at least at one end of the outer means an opening through which an animal will have free access to and from the inner container means. The upper portion of the outer means is movable with respect to the remainder thereof to and from a normal position located over the inner container means and blocking the latter from view at least from above. Thus, when the upper portion of the outer means is displaced from its normal position the inner container means is readily accessible so that the liner can be readily replaced, and at the same time the outer means provides a structure by which the entire commode can easily be transported to any desired location.

BRIEF DESCRIPTION OF DRAWINGS

The invention is illustrated by way of example in the accompanying drawings which form part of this application and in which:

FIG. 3 is a fragmentary sectional plan view taken along line 3—3 of FIG. 2 in the direction of the arrowss;

FIG. 4 is a fragmentary sectional elevation taken along line 4—4 of FIG. 3 in the direction of the arrows;

FIG. 5 is a fragmentary sectional elevation taken along line 5—5 of FIG. 1 in the direction of the arrows;

FIG. 6 is a fragmentary side elevation of another embodiment of a commode according to the invention; and FIG. 7 is a fragmentary transverse section of the structure of FIG. 6 taken along line 7—7 of FIG. 6 in the direction of the arrows.

DESCRIPTION OF PREFERRED EMBODIMENTS

Figure 1:
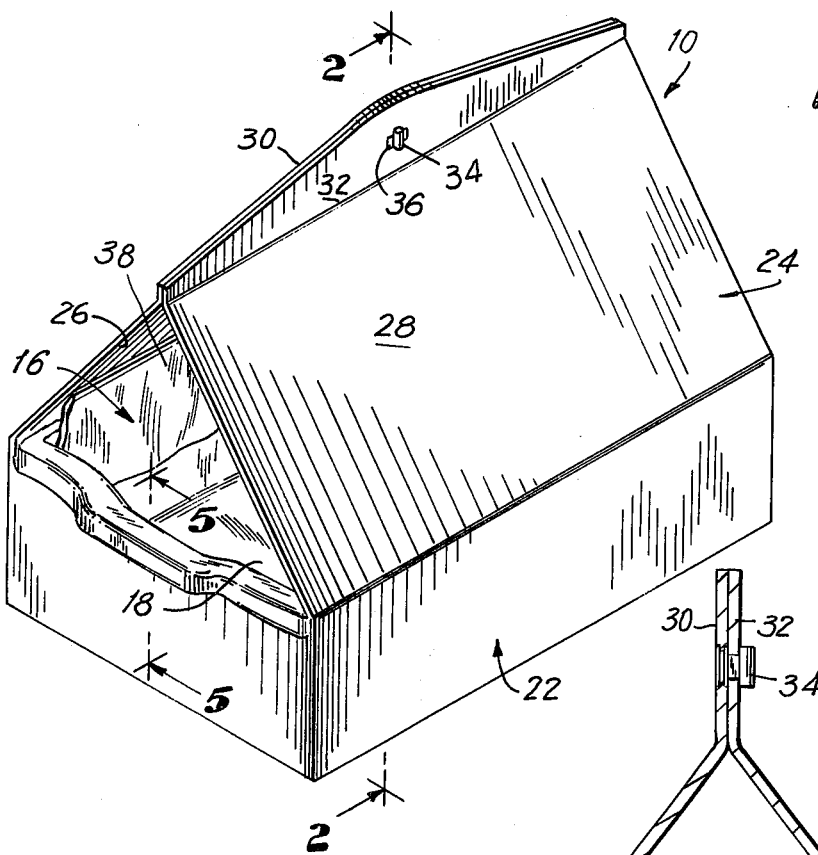
FIG. 1 is a perspective illustration of one possible embodiment of an animal commode according to the invention.
Figure 2:
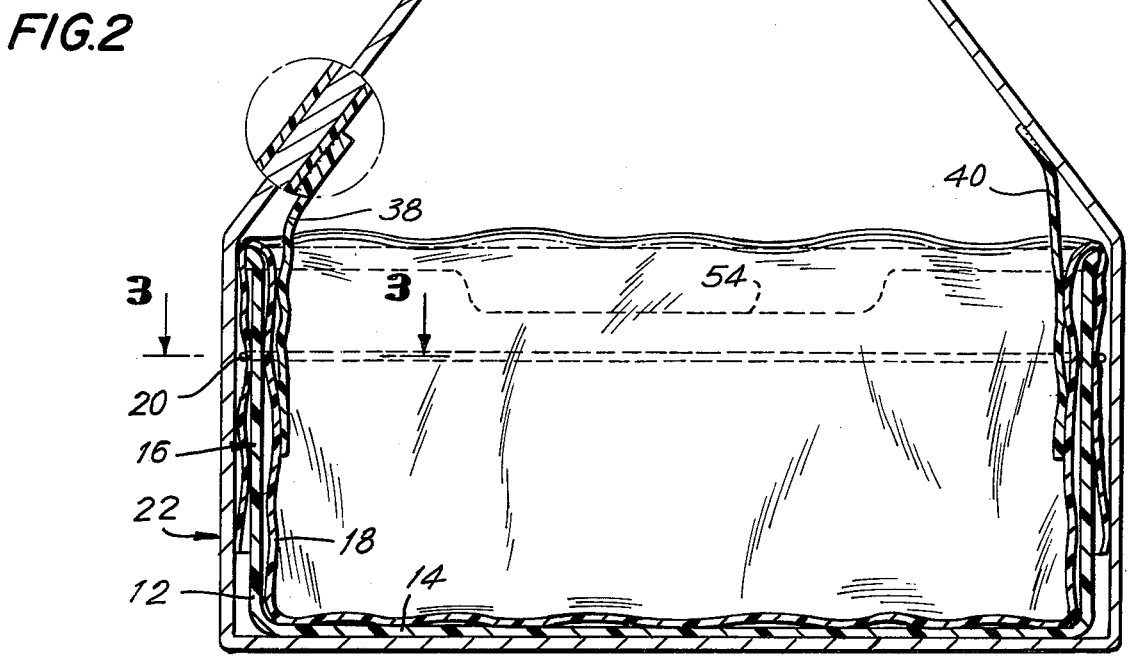
FIG. 2 is a transverse sectional elevation of the structure of FIG. 1 taken along line 2—2 of FIG. 1 in the direction of the arrows.

Referring now to FIGS. 1 and 2, there is illustrated therein an animal commode 10 according to the present invention. This animal commode 10 of the invention is particularly designed for use by cats, although it is of course also suitable for use by dogs and other household pets.

The animal commode 10 includes an inner container means 16 in the form of a relatively shallow elongated plastic pan having a bottom wall 14 and side walls 12 extending upwardly from the periphery of the bottom wall 14. A lining means 18 in the form of a suitable flexible sheet material of plastic or the like lines the interior of the inner container means 12 and is releasably held thereon by way of an elongated filamentary means 20 described in greater detail below. This means 20 may, for example, take the form of an elastic band.

The inner container means 16 is situated at least partly within an outer means 22 which extends beneath and around the inner container means 16 and which has an upper portion 24 situated over the inner container means 16 and forming at least at one end an opening 26 through which an animal such as a cat will have free access to the interior of the inner container means 16. In the illustrated example the outer means 22 provides a pair of opposed end openings 26 through which the pet will have free access into and out of the inner container means 16.

In the particular example illustrated in the drawings, the outer means 22 is in the form of a box having side walls within which the side walls 16 are located with the bottom wall 14 of the inner container means resting on the bottom wall of the outer means 22, as shown most clearly in FIG. 2.

The upper portion 24 of the outer means 22 is movable with respect to the latter to and from the normal position shown in FIGS. 1 and 2 where the upper portion 24 covers the inner container means 12. Thus by displacing the upper portion 24 away from its normal position illustrated in FIGS. 1 and 2 it is possible to have free access to the inner container means 12 for the purpose of removing and replacing the lining means 18, for example.

In the particular example illustrated in the drawings, the outer container means 22 may be made of cardboard, for example, covered at its exterior surface through suitable thermoplastic sheet material bonded to the cardboard in any suitable way. The upper portion 24 is in the form of a pair of flaps 26 and 28 swingably connected to a pair of opposed side walls of the outer means 22 in the manner illustrated most clearly in FIG. 1. These flaps thus can form triangular openings 26 and are inclined inwardly toward each other. They engage each other at their upper edges from which a pair of upper portions 30 and 32 extend. In order to releasably hold these portions 30 and 32 together the portion 30 may carry a suitable turnable fastener element 34 capable of being passed through an opening 36 in the portion 32 and turned to the position illustrated in FIG. 1 in order to hold the parts together. When it is desired to displace the upper portion 24 from its normal position shown in FIGS. 1 and 2, the part 34 can be turned and displaced through the opening 36 so that the pair of flaps 26 and 28 can be spread apart from each other, rendering the inner container means 16 freely accessible. At the same time, while the upper portion 24 remains in its normal position shown in FIGS. 1 and 2, it blocks from view, particularly from above, the interior of the inner container means 16 while at the same time an animal such as a cat will have free access to the interior of the container means 16. Moreover it is a simple matter for any individual to engage the flaps 24 and 26 in order to raise the entire commode 10 and move it from one location to another.

According to a further feature of the invention, a pair of flexible sheets 38 and 40 are heat-sealed to the inner layer of thermoplastic sheet material covering the inner surfaces of the flaps 26 and 28. These flexible sheets 38 and 40 are also made of a thermoplastic sheet material and hang freely down into the interior of the container means 16 engaging the lining means 18 along the elongated opposed inner surfaces of this lining means where it covers the opposed elongated side walls of the container means 16. Thus the flaps 38 and 40 will shield the interior of the outer means 22 from the interior of the container means 16 preventing particulate absorbent matter, for example, which may be located within the liner 18 in the interior of the container means 16 from reaching any space outside of the container means 16 in the interior of the outer means 22.

In addition it is to be noted, particularly from FIGS. 1 and 5, that the inner container means 16 is provided with flanges 50 which may have the stepped configuration illustrated in FIG. 5. These opposed end flanges 50 extend freely over the upper edges 52 of the opposed end walls of the outer means 22, as illustrated in FIG. 5. The liner means 18 extends around these flanges 50 in the manner illustrated in FIG. 5. The opposed end walls of the outer means 22 may be formed at central regions of the upper edges 52 with notches 54, as illustrated in FIG. 2, in order to facilitate grasping of the flanges 50 when the container means 16 is to be removed from and replaced in the outer means 22.

Thus, since the opposed end flanges 50 extend over the edges 52 at the opposed end walls of the outer means 22 and since the curtains or sheets 38 and 40 extend along the entire length of the container means at the inner lining 18 as described above, it is clear that through this combination of flanges and sheets 38 and 40 an effective shielding of the interior of the outer means 22 is achieved while at the same time a pet will have free access to the container means 16 by moving over one or the other of the flanges 50 so that any injury from the outer means 22 will be reliably avoided, particularly at the edges 52 thereof.

As is apparent from FIGS. 2 and 5, the inner lining means 18 is in the form of a flexible plastic sheet material which has a size great enough to extend freely around the top edge of the container means 16 and downwardly along the exterior thereof. The flexible means 20 will thus reliably hold the liner 18 against the container means 16. In order to enhance the removable connection of the liner 18 to the container 16, at least one corner of the container 16 is formed with a notch 54, shown most clearly in FIGS. 3 and 4, so that by way of this notch it is possible for the filamentary means 20 to cause part of the flexible lining means 18 to enter into the notch, thus achieving an exceedingly secure connection while at the same time the elastic 20 can readily be removed to facilitate removal of the liner 18 and replacement thereof.

Of course, instead of using an elastic band for the filamentary means 20 it is possible to use a suitable cord.

As was pointed out above, one of the features of the commode of the invention is that it is portable so that it can easily be carried about. In order to render such portability even more convenient, the embodiment of FIGS. 6 and 7 may be used. Thus in the embodiment of FIGS. 6 and 7 the upper portions 30 and 32 are extended upwardly beyond the fastener 34 through a distance sufficient to make it possible to form in these portions 30 and 32 aligned slots 56 through which the fingers of a hand may readily extend to facilitate carrying about the entire commode 10 as pointed out above.

As is apparent from the above description, during normal use of the commode an animal will have free access to and from the interior of the container means 16 in the manner described above while at the same time the commode is easily portable and the upper portion 24 of the outer means 22 blocks the interior of the container means 16 from view, particularly from above.

When it is desired to replace the liner 18, it is a simple matter to unfasten the portions 26 and 28 from each other so that they can be folded back away from each other rendering the inner container means 16 freely accessible. The operator can now readily grasp beneath the flanges 50 in order to raise the entire inner container means 16 out of the outer means 22. Then the filamentary means 20 can readily be removed so that now the entire liner 18 can be removed and replaced by a new liner which is held in position by the filamentary means 20 in the manner described above. Thereafter the inner container means 16 with the new liner 18 is replaced in the interior of the outer means 22. The flaps 26 and 28 thereof are again fastened to each other, so that the commode is again ready for use. When the flaps 26 and 28 are displaced away from each other to give access to the inner container means 16 it is a simple matter to turn the sheets 38 and 40 out of the way so that they will not interfere with the manipulations in connection with replacement of the liner 18. Also, when the flaps 26 and 28 are returned to their normal position shown in FIGS. 1 and 2, the sheets 38 and 40 will automatically hang down into the position illustrated in FIG. 2. Flaps 26 and 28 can also be folded inwardly into overlapping relation for storage of animal commode 10.

It will be seen, therefore, that with the above-described structure of the invention an exceedingly convenient commode is provided for the use of animals eliminating all of the problems heretofore encountered in connection with sanitary facilities for animals. Moreover, it is apparent that the commode of the invention is of relatively low cost and convenient to manipulate.

What is claimed is:

1. In an animal commode, inner container means for receiving an animal, said inner container means having a bottom wall and side walls extending upwardly from the periphery of said bottom wall while being open at the top, so that an animal can enter into said inner container means, liner means removably carried by said inner container means and lining the interior thereof, so that from time to time said liner means can be removed from said inner container means and replaced by another liner means, and outer means extending beneath said inner container means around the latter and over the top thereof while leaving said inner container means freely accessible to an animal at least at one end of said outer means, said outer means having over said container means an upper portion blocking the interior of said inner container means from view at least from above and said upper portion of said outer means being movable with respect to the remainder of said outer means to and from a normal position located over said inner container means, so that when said upper portion of said outer means is moved away from said normal position thereof said inner container means is freely accessible for removal and replacement of said liner means, said outer means being in the form of a box in which said inner container means is located, and said upper portion of said outer means being in the form of a pair of swingable flaps of said box pitched toward each other and removably connected to each other over said inner container means for providing at opposed ends of the latter a pair of triangular openings through which an animal has free access to the interior of said inner container means.

2. The combination of claim 1 and wherein said inner container means has at opposed ends a pair of flanges extending over edges of said box for giving free access to the interior of said inner container means through either of the openings.

3. The combination of claim 2 and wherein said liner means extends around said flange.

4. The combination of claim 3 and wherein said inner containr means has a corner portion formed with a notch while a flexible filamentary means extends around said inner container means at the exterior thereof overlapping said liner means to hold the same connected to said inner container means, said filamentary means extending into said notch for providing a secure connection through said filamentary means of said liner means to said inner container means.

5. The combination of claim 1 and wherein said upper portion of said outer means carries at an upper region thereof a handle means by which said outer means together with said inner container means can readily be carried about.

6. The combination of claim 5 and wherein each of said pair of swingable flaps of said box includes at an edge thereof spaced from said inner container means an upper portion, the respective upper portions of said pair of flaps extending substantially parallel to each other and in engagement with each other when said flaps are in said normal position to define said handle means.

7. The combination of claim 1 and wherein said upper portion of said outer means has an inner surface situated over and directed downwardly toward the interior of said inner container means, and flexible sheet means fixed to said inner surface of said outer upper portion of said outer means and hanging from the latter downwardly into said inner container means along said liner means for shielding the interior of said outer means behind said sheet means from the interior of said inner container means.

8. The combination of claim 1 and wherein said outer means is lined at least at inner surfaces of said flaps which are directed downwardly toward the interior of said container means with a thermoplastic sheet material, and flexible thermoplastic sheet means heat-sealed to said material lining said inner surfaces of said flaps and hanging therefrom into the interior of said inner container means in engagement with said lining means at least along opposed sides of said inner container means which extend between said flanges thereof for shielding the interior of said outer means from the interior of said inner container means.

9. The combination of claim 1 and wherein each of said pair of swingable flaps includes an upper portion at an edge thereof spaced from said inner container means, said upper portions of said flaps being in engagement and extending substantially parallel to each other when said flaps are in said normal position, said outer means including means for releaseably securing together said outer portions of said flaps.

* * * * *